US010044742B2

(12) United States Patent
Nguyen et al.

(10) Patent No.: US 10,044,742 B2
(45) Date of Patent: *Aug. 7, 2018

(54) VERIFICATION OF COMPUTER SYSTEM PRIOR TO AND SUBSEQUENT TO COMPUTER PROGRAM INSTALLATION

(71) Applicant: SteelCloud, LLC, Ashburn, VA (US)

(72) Inventors: Bao Nguyen, Ashburn, VA (US); Fredi Jaramillo, Ashburn, VA (US); Brian H. Hajost, Great Falls, VA (US)

(73) Assignee: STEELCLOUD, LLC, Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,272

(22) Filed: Nov. 28, 2017

(65) Prior Publication Data

US 2018/0083998 A1 Mar. 22, 2018

Related U.S. Application Data

(63) Continuation of application No. 15/083,700, filed on Mar. 29, 2016, now Pat. No. 9,853,990, which is a
(Continued)

(51) Int. Cl.
*G06F 7/04* (2006.01)
*H04L 29/06* (2006.01)
(Continued)

(52) U.S. Cl.
CPC .......... *H04L 63/1425* (2013.01); *H04L 41/00* (2013.01); *H04L 63/10* (2013.01);
(Continued)

(58) Field of Classification Search
None
See application file for complete search history.

(56) References Cited

U.S. PATENT DOCUMENTS

6,675,382 B1 1/2004 Foster
7,266,819 B2 9/2007 Helgesen
(Continued)

*Primary Examiner* — Fatoumata Traore
(74) *Attorney, Agent, or Firm* — Steven M. Greenberg, Esq.; CRGO Law (57) ABSTRACT

Embodiments of the present invention provide a method, system, and computer program product for debugging a computer environment. In an embodiment of the invention, an anomaly is detected in a computing environment of multiple different computing devices disposed in multiple different network domains. Thereafter, administrative network privileges to access the multiple different network domains are acquired and existing resources in the computing environment are identified. Additionally, a signature file is loaded into a memory of the computer, where the signature file denotes infrastructure requirements of the computing environment, and the existing resources and the infrastructure requirements denoted in the signature file are compared to determine whether a disparity exists between the existing resources and the infrastructure requirements. Upon determining that the disparity exists between the existing resources and the infrastructure requirements a configuration of the computing environment of the multiple different computing devices is adjusted to fix the disparity.

14 Claims, 3 Drawing Sheets

Related U.S. Application Data continuation of application No. 13/567,011, filed on Aug. 4, 2012, now Pat. No. 9,313,040.

(51) Int. Cl.
*H04L 12/24* (2006.01)
*H04L 29/08* (2006.01)
*G06F 8/71* (2018.01)
*G06F 8/65* (2018.01)
*G06F 8/70* (2018.01)
*G06F 8/61* (2018.01)

(52) U.S. Cl.
CPC ............... *H04L 67/34* (2013.01); *G06F 8/61* (2013.01); *G06F 8/65* (2013.01); *G06F 8/70* (2013.01); *G06F 8/71* (2013.01)

(56) References Cited

U.S. PATENT DOCUMENTS

| | | |
|---|---|---|
| 8,010,777 B2 | 8/2011 | Nandan |
| 8,261,354 B2 | 9/2012 | Kline |
| 2003/0115461 A1 | 6/2003 | O'Neill |
| 2003/0188160 A1 | 10/2003 | Sunder et al. |
| 2004/0003266 A1 | 1/2004 | Moshir et al. |
| 2006/0224544 A1* | 10/2006 | Keith, Jr. ............... G06N 5/04 706/60 |
| 2007/0044077 A1* | 2/2007 | Srivastava .......... G06F 9/44589 717/126 |
| 2008/0320109 A1 | 12/2008 | Andrews |
| 2010/0031249 A1 | 2/2010 | Baliga |
| 2012/0155323 A1 | 6/2012 | Ramachandran et al. |
| 2014/0040990 A1 | 2/2014 | Nguyen et al. |
| 2016/0212164 A1 | 7/2016 | Nguyen et al. |

* cited by examiner

FIG. 3

VERIFICATION OF COMPUTER SYSTEM PRIOR TO AND SUBSEQUENT TO COMPUTER PROGRAM INSTALLATION

CROSS-REFERENCE TO RELATED APPLICATIONS

This application is a Continuation of U.S. patent application Ser. No. 15/083,700, filed on Mar. 29, 2016, now allowed, which is a Continuation of U.S. patent application Ser. No. 13/567,011, filed on Aug. 4, 2012, now U.S. Pat. No. 9,313,040, all of the teachings of which are incorporated herein by reference in their entirety. This application is also related to European Patent Application No. EP13178684.0, filed Jul. 31, 2013, the teachings of which, also, are incorporated herein by reference.

BACKGROUND OF THE INVENTION

Field of the Invention

The present invention relates to a computer enterprise system and, more particularly, to maintaining operation of the computer enterprise system.

Description of the Related Art

Complex computing arrangements have made the installation of computer programs on a host server complicated as client/server environment issues often lead to implementation delays. A system administrator no longer has a host server serving one type of client. As such, a system administrator no longer goes to install a computer program without expecting some errors or compatibility issues due to the multiplicity of end user computing devices. In addition, a system administrator must have cross-domain expertise to understand the variety of computing devices as well as be able to manually set-up and verify successful installation of any new computer program.

A system administrator further needs to be able to determine why an installation may have been unsuccessful for a handful of machines, while successful for others. In addition to problems that arise with the deployment of a software program, including issues of reliability, a system administrator needs to be able to identify changes in the infrastructure of an enterprise system that can bring the whole system down, such as when upgrades, patches, or new software are added to enterprise infrastructure. The administrator needs to identify whether there is a software error, an operating system issue, or human error as well as the location of the error within the system. This may involve infrastructure that can include hundreds or even thousands of individual components with an almost infinite number of combinations of software settings and configurations on multiple hosts and clients with multiple parameters.

BRIEF SUMMARY OF THE INVENTION

Embodiments of the present invention address deficiencies of the art in respect to debugging a computer system and provide a novel and non-obvious method, system, and computer program product for validating resource requirements in a computing environment. In an embodiment of the invention, a signature file denoting infrastructure requirements of a computing environment to support a computer program to be installed in the computing environment of multiple different computing devices disposed in multiple different network domains can be loaded. Administrative network privileges to access the multiple different network domains can be acquired. At least one deficiency of the infrastructure requirements corresponding to one of the network domains can be identified, remediated, and reported.

In another embodiment of the invention, a computer infrastructure debugging system can be provided. The system can include at least one computer with at least one processor and memory coupled to a computing environment of multiple different computing devices within different network domains defined over a computer communications network and an infrastructure validating module. The module can include program code enabled upon execution in memory of the at least one computer to load a signature file denoting infrastructure resources of the computing environment to support a computer program to be installed in the computer environment, to acquire administrative network privileges to access the multiple different network domains in the computing environment, and to identify at least one deficiency of the infrastructure requirements in a corresponding network domain. The program code of the module can further include program code to remediate the identified deficiency and to report the identified deficiency.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred; it being understood, however, that the invention is not limited to the precise arrangements and instrumentalities shown, wherein.

DETAILED DESCRIPTION OF THE INVENTION

Embodiments of the invention provide for validating a computing environment to ensure that the computing environment has been properly configured to support proper operation of an installed computer program. In accordance with an embodiment of the invention, infrastructure validating logic executes in memory of a computer coupled to a computing environment of different computing devices within different network domains defined over a computer communications network. The logic first acquires administrative-level access to the different network domains and thereafter validates the different network domains including computing devices disposed therein as being able to support the installation of the computer program according to infrastructure requirements, and in particular, resource requirements denoted within an XML signature file. Upon determining a deficiency in terms of the infrastructure requirements, the logic accesses a device within a corresponding one of the network domains in which the determined deficiency exists in order to remediate the deficiency by, for example, updating security rights, updating a web browser to the required version, and/or creating a required amount of disk storage. Further, the logic reports the identified deficiency by, for example, displaying the identified deficiency to a user via a dialog box and/or logging such in a file. When no deficiencies are determined to remain, the logic also reports the ability to proceed in deploying the computer program to the computing environment by, for example, displaying the ability to proceed to a user via a dialog box.

Figure 1:
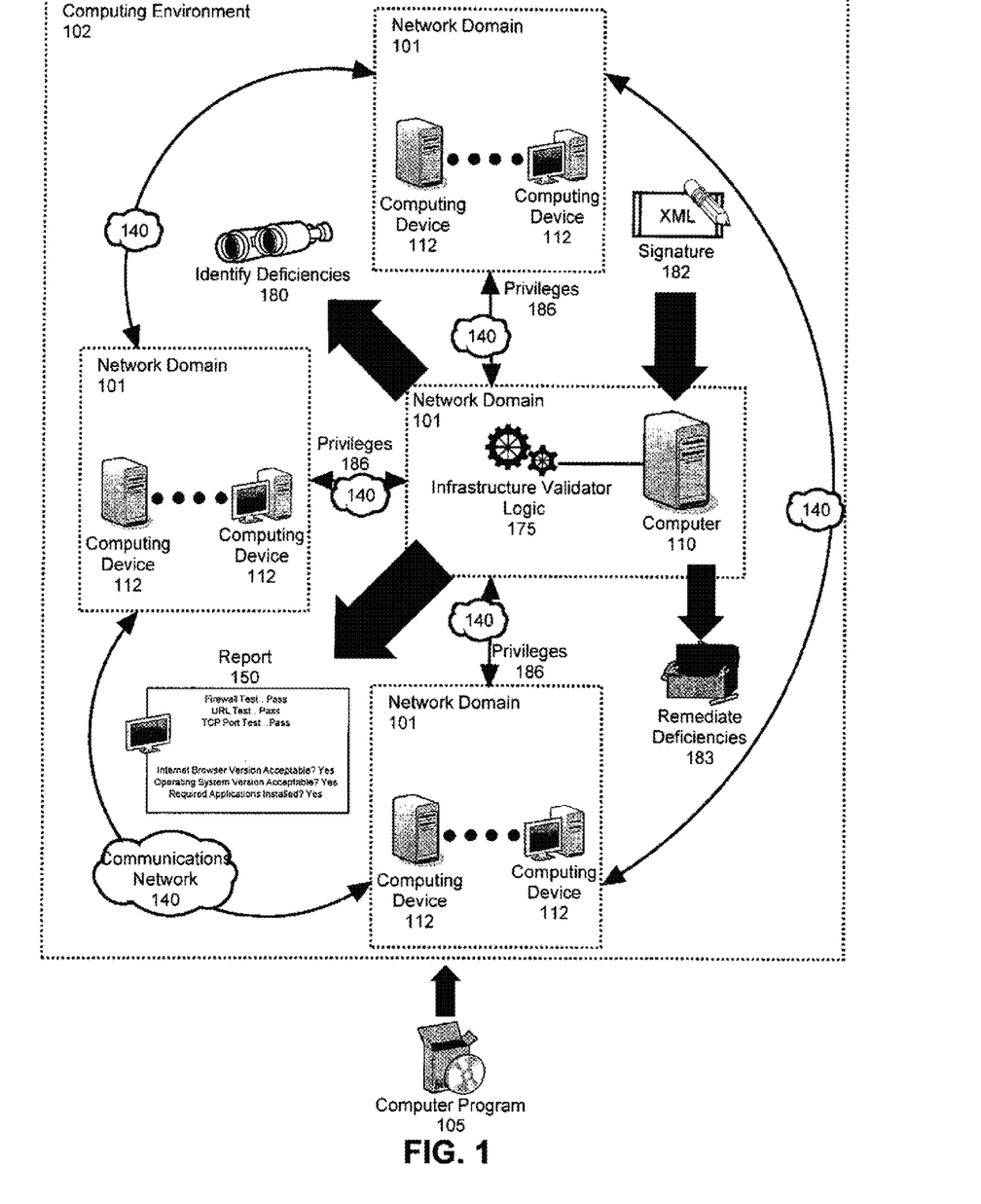
FIG. 1 is a pictorial illustration of a process for validating infrastructure resources in a computing environment.

In further illustration, FIG. 1 depicts a process for validating infrastructure resources in a computing environment 102 to ensure that the computing environment 102 has been properly configured to support operation of an installed computer program 105. Of note, the computing environment 102 includes different computing devices 112 within different network domains 101 defined over a communications network 140. The process for validating infrastructure resources is used for validating the computing environment 102 before the installation of a computer program 105 or anytime after to debug the infrastructure of a computing environment 102 when an error or other issue occurs.

As seen in FIG. 1, infrastructure validating logic 175 on a computer 110 in a network domain 101 loads a signature file 182 denoting the infrastructure requirements to support a computer program 105 to be installed in the computer environment 102. The infrastructure requirements include the resource requirements of the computing devices 112 of the multiple different network domains 101, where resource requirements include, but are not limited to, available disk storage, available network bandwidth, and available processing power. Infrastructure requirements also include security rights established for a particular network domain 101 as well as network connectivity established for a network resource within the computing environment. Of note, the signature file 182 is formatted according to the extensible markup language (XML). The logic 175 further acquires administrative network privileges 186 for the different network domains 101 and identify deficiencies 180 of the infrastructure requirements in one of the network domains 101. The identified deficiencies 180 are remediated 183, if the security rights allow. The identified deficiency 180 is reported 150 to an end user and/or logged.

Upon determining that no deficiencies of the infrastructure requirements are identified, infrastructure validating logic 175 reports to an end user, for instance, the ability to install the computer program 105. Further, the logic 175 prompts a user for configuration data before a user, usually a system administrator or end user, installs a computer program 105 on a computer 110. Of note, configuration data includes, but is not limited to, (1) administration account information, for instance domain, user name, and user password, (2) SQL server information, such as server name, path, type of authentication (Windows® or SQL), user name, password for the SQL Server®, and (3) Microsoft® Exchange server information, including name and path, and location where log reports will be generated. Of further note, optionally, the infrastructure validating logic 175 traps the configuration data so it can be utilized in the installation of the computer program 105 after verification. The XML signature 182 replaces hard coding of detail logic, which serves to identify any requirements for installation and proper functioning of the computer program 105 in the computing environment 102. Specifically, the XML signature 182 includes information relating to the resources—for instance computer program prerequisites and IT environment requirements—required for the proper installation and subsequent functioning of a computer program 105, including but not limited to network connectivity, available disk storage, available network bandwidth, and available processing power.

Of further note, resource requirements further includes both computer program prerequisites and IT environment requirements, which include, but are not limited to, external and internal URL access, database connectivity, firewall ports and settings, existence of required software (such as a mail program or web browser), and version validation of required software. Resources also include identifying a particular arrangement of computer program prerequisites and IT environment settings, such as the existence that certain software does not exist (test for the negative), connectivity to other systems (i.e. MS EXCHANGE, web servers, etc.), set-up and configuration of other systems (i.e. MS EXCHANGE, web servers, etc.), validation of security settings for one or more users and/or administrators (i.e. Active Directory) required to administer an application, validation of versions and existence of any widget or other applications (i.e. specific version of Java, .Net, etc.), local security settings in Windows, local Windows policy settings, and local Windows services settings. In other words, resource requirements identify specific settings (whether for a computer program or for system infrastructure) required as well as identify and/or run tests or other checks to ensure all settings are appropriate for successful installation of a computer program or for proper infrastructure functioning.

In one instance, a validation scan of the existing resources is conducted after the infrastructure validating logic 175 assumes the security profile of the computer 110 and computer program 105 to determine whether the required resources are met. In another instance, a computer environment 102 is probed so that any existing resources in the computer environment 102 are identified. The identified existing resources are stored after infrastructure validating logic 175 assumes the security profile. Optionally, the results of the validation scan are displayed. Further, infrastructure validating logic 175 logs the results of the validation scan so that a user can have a description of the success or failure of the validation scan. In an embodiment of the invention, if the required resources are in place (i.e. the existing resources meet the required resources), a user is able to direct the installation of the computer program 105 after being prompted via a dialog box, for instance, to continue with the installation of the computer program 105. If the required resources are found not to have been satisfied, i.e. a deficiency is identified, a user is informed of the error and is prompted to correct any missing or failed requirement.

In addition to verifying the presence of any required resources before a computer program 105 is installed, infrastructure validating logic 175 is executed at any time an anomaly is detected in the operation of the computer program 105, so as to assist a user to debug the anomaly. After the security profile of the network domain 101 is adopted, infrastructure validating logic 175 probes the computing environment 102, including the different network domains 101, to identify existing resources, which are then stored. An XML signature 182, specifying the required resources, is loaded so that the required resources and the existing resources are compared. A report 150 of the results of the comparison is then provided. Of note, the results of the comparison are displayed to an end user. In addition, a log showing all activities conducted includes the results of the comparison.

Of note, missing or incorrect resources for the computer program 105 or for the computing environment 102 are automatically corrected, when possible. Adjustments prior to the installation of a computer program 105 and/or to support the computing environment 102 are possible, because infrastructure validating logic 175 has cross-domain access to each separate domain or enclave (each network domain 101) in the computing environment 102, for instance any database administration account, e-mail account, application administration account, etc. In other words, infrastructure validating logic 175 has access to each separately administered or secured infrastructure within the greater computing environment 102, which enables infrastructure validating logic 175 to make adjustments when needed (assuming the security permissions of the domains allow such) in order to properly configure or reconfigure the infrastructure accounts (database, application, e-mail, etc.) prior to installation of a computer program 105 or subsequently, when there is a system infrastructure anomaly. Further, the infrastructure validating logic 175 is associated with the documentation of the computer program 105 so, when an error is encountered, the user is displayed the specific documentation supplied by the vendor of the computer program 105 related to the error encountered.

Figure 2:
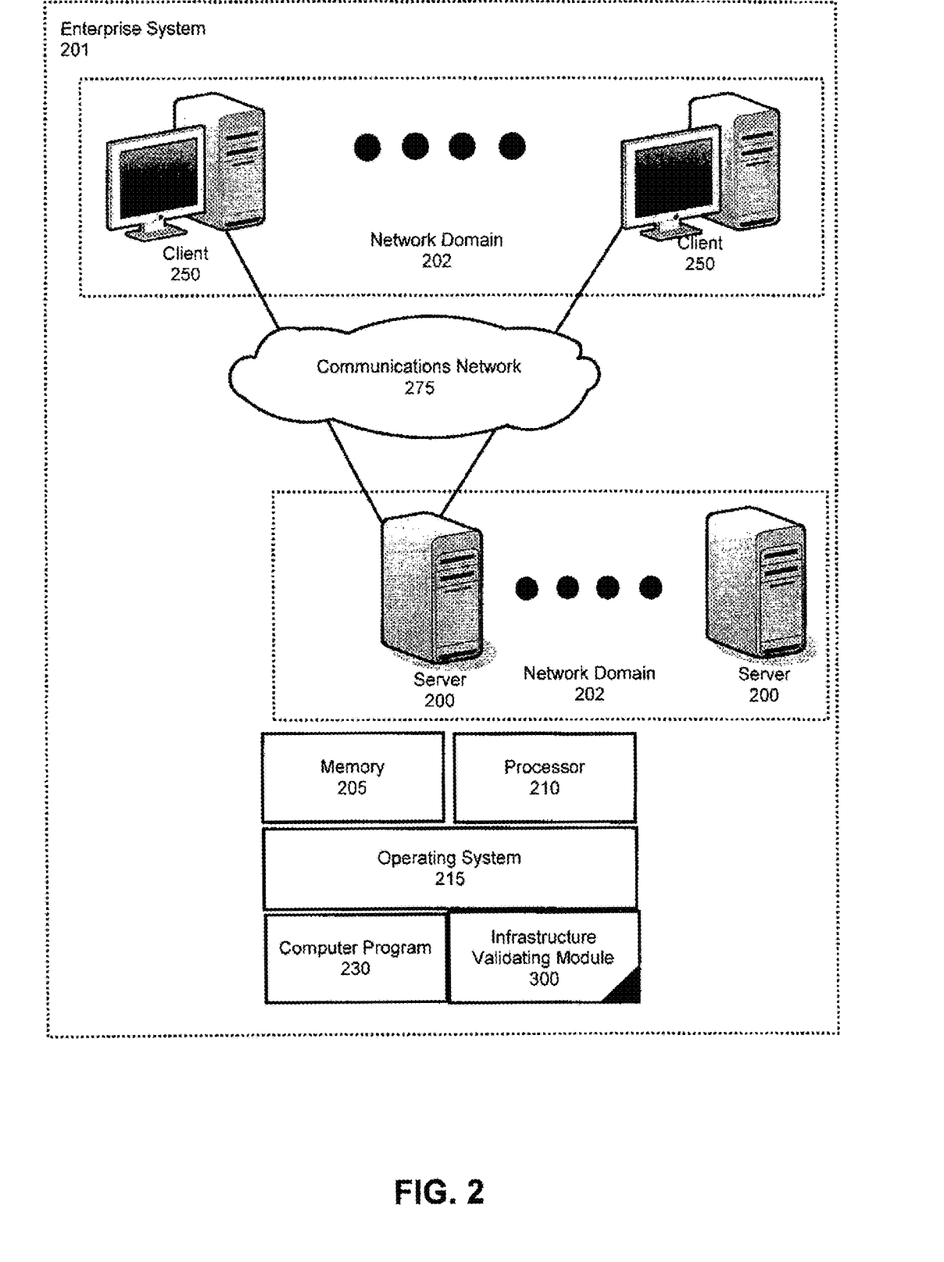
FIG. 2 is a schematic illustration of an infrastructure debugging system configured for validating a computer before installation of a computer program or for debugging an enterprise system; and, FIG. 3 is a flow chart illustrating a process for validating resources in a computing environment before or after installing a program on a computing device in a computing environment of multiple different network domains.

The process described in connection with FIG. 1 is implemented in an infrastructure debugging system. In further illustration, FIG. 2 schematically shows an infrastructure debugging system configured for validating a computer or computer system before or after installing a computer program on the computer in an enterprise computer system. Of note, installation of a computer program 230 is not required for the infrastructure validating module 300 to be utilized in debugging the infrastructure of an enterprise system 201. The infrastructure debugging system includes at least one client 250 coupled to at least one server 200 via a communications network 275 in an enterprise system 201. The server 200 includes at least one processor 210 and memory 205 supporting the execution of an operating system (O/S) 215. The O/S 215, in turn, supports a computer program 230 and an infrastructure validating module 300, which is used to validate the IT environment and the prerequisites (the resources) required for the computer program 230 to ensure the environment is properly set up to allow the computer program 230 to both be installed and run properly on the enterprise system 201. In other words, the infrastructure validating module 300 is also used to debug the enterprise system 201 when an anomaly is detected or when something in the system stops working, for instance printing or e-mail. The infrastructure validating module 300 includes program code, which, when executed by at least one processor 210 of the server 200, loads a signature file denoting the infrastructure requirements of the enterprise system 201 to support a computer program 230 being installed in the enterprise system 201 with multiple different computing devices (including clients 250 and servers 200), which can be in different network domains 202. Of note, the signature file is formatted according to extensible markup language (XML) and includes the infrastructure requirements, which includes the resource requirements of the various servers and clients in the different network domains 202. The resource requirements include requirements selected from the group consisting of available disk storage, available network bandwidth and available processing power. Further, the module 300 includes program code that acquires administrative network privileges to access the different network domains 202. The infrastructure validating module 300 identifies at least one deficiency in the enterprise system 201. Further, the identified deficiency is remediated as well as reported. In addition, the module 300 includes program code that reports the ability to install a computer program 230 when no deficiencies of the infrastructure requirements are identified in the enterprise system 201.

In addition, the infrastructure validating module 300 includes program code to prompt a user for configuration data upon receiving a request for installing a computer program 230. Once a user enters the configuration data, which includes indicating the additional servers in a network, such as a mail server, the program code of the infrastructure validating module 300 traps the configuration data for later use in the installation process after the environment and computer program prerequisites are validated.

Thereafter, the program code of the infrastructure validating module 300 utilizes computer program signatures to identify resources, including computer program prerequisites and environment properties, upon adopting the security profile of the different network domains 202. Of note, the infrastructure validating module 300 also adopts administrative-level settings for each separate domain or enclave in an enterprise system 201, including, but not limited to, e-mail systems, database systems, application systems, and network security systems. This cross-domain access provides the infrastructure validating module 300 with access to each administered and/or secured infrastructure within the greater enterprise infrastructure. In this way, the infrastructure validating module 300 is able to make adjustments to different settings necessary to install a computer program 230 or support/debug the enterprise system 201. Further, the program code of the infrastructure validating module 300 performs a validation scan of the IT environment to validate that the environment (any resource) is properly set. The program code of the module 300 logs the results of any validation scan. The results of the scans may also be displayed to a user on a client 250. Upon determination that the resources are met, the program code of the infrastructure validating module 300 directs installation of the computer program 230 for a user affirmative selecting to install the computer program 230 on the validated environment.

Upon determination that the resources are not met, the program code of the infrastructure validating module 300 displays any error with the corresponding documentation, if available, that a vendor of the computer program 230 specified. The module 300 automatically corrects resources, when possible. In addition, the module 300, via prompt, ask a user if he/she wishes to continue, thus allowing the user to address any resources before proceeding.

If, after installation of the computer program 230, an anomaly is detected during the operation of the installed computer program 230 or in the enterprise system 201 itself, the program code of the infrastructure validating module 300 is utilized in debugging both the anomaly and, more specifically, the IT environment by identifying the existing resources in the enterprise system 201 in response to adopting a security profile of the enterprise system 201. Of note, the security profile is a multi-domain security profile. Upon storing the identified existing resources, the program code of the module 300 loads an XML signature that indicates the required resources. The required resources and the existing resources are compared, and the result of the comparison can be reported by the infrastructure validating module 300.

Of note, if the program code of the module 300 determines a disparity upon comparing the required resources to the existing resources, the program code of the infrastructure validating module 300 makes adjustments to different settings (resources) provided that the security permissions of the cross-domain security profile allow for reconfigurations and/or updates to resources. In addition, a log is used to record all activities of the module 300 as well as the results of the comparison. Further, the results of the comparison are displayed to an end user. Even further, the program code of the infrastructure validating module 300 displays any messages, including error messages, with the corresponding documentation, if available, that a vendor supplied.

Figure 3:
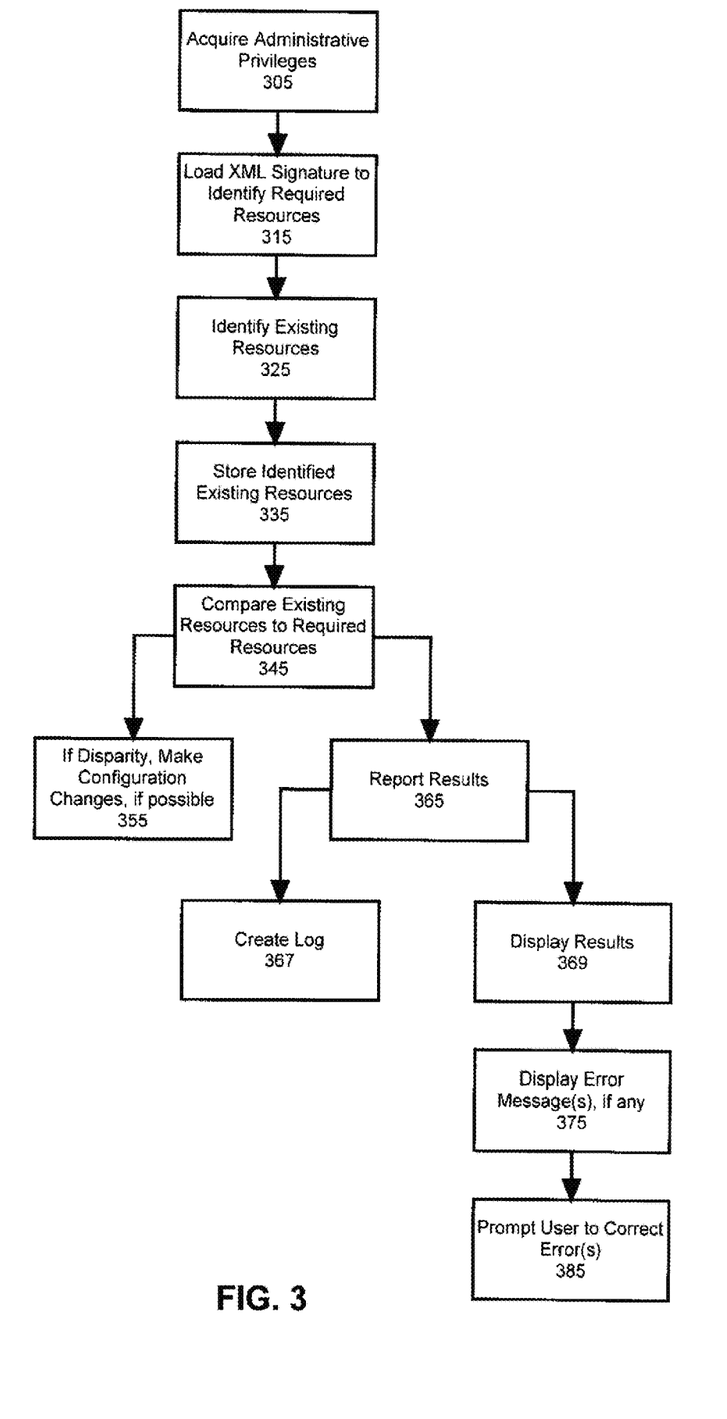

In even yet further illustration of the operation of the program code of the infrastructure validating module 300, FIG. 3 is a flow chart illustrating a process for debugging the infrastructure of a computing environment in an embodiment of the invention. After an end user receives a report of an anomaly in the system, from either another end user or from the system itself, the program code of the infrastructure validating module 300 is initiated, by an end user, for instance, such that the module 300 acquires administrative privileges, as shown in block 305. Of note, the infrastructure validating module 300 adopts the privileges of each domain (each separately administered or secured infrastructure within the greater enterprise infrastructure), such as email, database, security, and application. In other words, the module 300 handles a multitude of domain accounts and is, thus, cross domain capable. Of note, the infrastructure validating module 300 is initiated automatically, without end user involvement, at the detection of an anomaly in the computing environment. An anomaly includes any issue, problem, etc. that prevents the computing environment from working properly, for instance not being able to send e-mail.

Upon acquiring administrative privileges, the infrastructure validating module 300 loads an XML signature, as shown in block 315. The XML signature is an XML file identifying the resource requirements for the computing environment. Of note, it is the required resources that identify the resources in the target computer system needed so that the target computer system can function properly. In other words, the XML signature identifies the infrastructure settings required for the computing environment to function properly. The infrastructure validating module 300 identifies existing resources in the computing environment, as shown in block 325. Resources include both specific computer program settings and IT environment settings. Further, the possible resources that are identified by the module 300 are not limited to a specific set of settings or values, but can include the current settings in an e-mail server, the current Java version(s) in use, firewall port rules, .NET version, etc. As illustrated in block 335, the identified existing resources are stored.

The required resources are compared to the identified existing resources, as indicated in block 345. If any disparities are identified between the existing resources and the required resources, the module 300 makes configuration changes, if possible, as illustrated in block 355. As the infrastructure validating module 300 adopts a multitude of domain accounts, which allows it access to each separately administered or secured infrastructure network domain within the greater computing environment, the module 300 makes configuration changes on-the-fly across multi-domains to properly configure identified mismatched resources between required resources and existing resources when security rights set in the adopted domain accounts allow for such changes.

Further, the results of the comparison of the existing resources to the required resources are reported, as shown in block 365. A log of all activities is created, as in block 367. The log includes the results of the comparison, including any disparities, warnings, acceptances, and passes. In addition, if there is an error generated, the log includes the error message along with any vendor-supplied documentation related to the error, if available. As shown in block 369, the results of the comparison are also displayed to an end user. In one embodiment, each required resource is displayed with a color coded pass/fail/warning (green/red/yellow, respectively). In addition, as illustrated in block 375, if an error is generated, the display shows the error message along with any vendor-supplied documentation related to the error, if such documentation is available. An end user is further prompted to correct any errors, as indicated in block 385. In this way, infrastructure validating module 300 is used to debug a computer target system.

In another embodiment of the invention, the infrastructure validating module 300 also validates a computer and the system of which it is part before installing a computer program on a computer. After a computer program installation request is received, a user is prompted to provide configuration data, which relates to the IT environment of the user. Optionally, the configuration data is trapped for use in the installation of the computer program after the configuration data has been validated. The security profile of the computer/computer program is adopted. In this way, additional security access does not need to be addressed. The required resources needed for the computer program to be both installed and function properly after installation is read from an XML signature specific to the computer program. The XML signature is a XML file that specifies the specific resources (computer program prerequisites and IT environment requirements) required for the system, within which the computer program is being installed.

A validation scan of the IT environment is performed, so a determination as to whether the resources specified in the XML signature are met. The results of the validation scan is stored, logged, and/or displayed. In this way, the information captured is used to auto-fill account, system, and database information during the installation of a computer program or used in the debugging of the computing environment. For instance, the infrastructure validating module 300 is displayed for a user the tests and/or checks run and whether the test/check was successful for any resource checked. Further, any required resource is tagged with a pass (green)/fail (red)/warning (yellow) system in the display. More specifically, if the transmission control protocol (TCP) port test was successful, a green check mark indicating such is displayed. As a further example, if an installation requirement is whether a mail program is installed and it is determined that a mail program is installed, then, again, a green check mark indicating success is displayed. If all resources are met, a user is directed to proceed with installation of the computer program. In one instance, the user is prompted with a dialog box asking whether the user wishes to proceed with the installation of the computer program. If the user does select to proceed with the installation, the now verified configuration data trapped is used in the installation of the computer program.

Regardless of whether a validation scan determines that the resources are met, a log is created. The log lists all the results of the validation scan, so a user has a description of what was successfully validated and what was not. Further, the results of a validation scan is, optionally, displayed in any manner; for instance, a negative or a failed validation of an installation requirement can be displayed as a red (x) or a yellow exclamation point (!). Of note, any error message is displayed with the vendor-supplied documentation corresponding to the error, if available. In addition, the module 300 corrects incorrect installation parameters, when possible. A user is also prompted to correct any errors. Once any errors have been corrected (or new information entered), the validation scan is performed again.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer processor implemented infrastructure debugging method comprising:
   detecting an anomaly in a computing environment of multiple different computing devices disposed in multiple different network domains, each different network domain being separately administered or separately secured, the anomaly preventing at least a portion of the computing environment from either functioning as expected or producing an expected result; and,
   on condition that the anomaly is detected:
   (A) acquiring administrative network privileges in order to access the multiple different network domains in the computing environment;
   (B) identifying one or more existing resources in the computing environment;
   (C) loading a signature file into memory and extracting from the signature file one or more infrastructure requirements of the computing environment contained within the signature file, the requirements including resource requirements of the multiple different computing devices disposed in multiple different network domain;
   (D) comparing one of the one or more existing resources to a corresponding infrastructure requirement contained within the signature file to determine whether or not a disparity exists between the one of the one or more existing resources and the corresponding infrastructure requirements; and,
   (E) on condition that the disparity is determined to exist between the one of the one or more existing resources and the corresponding infrastructure requirement, adjusting a configuration of the computing environment by at least one of removing the disparity or changing a corresponding existing resource to conform with the corresponding infrastructure requirement.

2. The method of claim 1, further comprising reporting the results of comparing the one of the one or more existing resources to the corresponding infrastructure requirement contained within the signature file.

3. The method of claim 2, wherein reporting the results of comparing the one of the one or more existing resources to the corresponding infrastructure requirement contained within the signature file comprises reporting the results of comparing the one of the one or more existing resources to the corresponding infrastructure requirements to a user by displaying the results in a dialog box to the user.

4. The method of claim 2, wherein reporting the results of comparing the one of the one or more existing resources to the corresponding infrastructure requirement contained within the signature file comprises reporting the results of comparing the existing resources to the infrastructure requirements via a log.

5. The method of claim 1, further comprising:
   (F) on condition that an error is generated upon comparing the one of the one or more existing resources to the corresponding infrastructure requirement denoted in the signature file, determining whether vendor-supplied documentation corresponding to the error exists; and,
   (G) on condition that the vendor-supplied documentation corresponding to the error exists, displaying the error and also the vendor-supplied documentation in a dialog box to a user.

6. A computer infrastructure debugging system comprising:
   at least one computer with at least one processor and memory coupled to a computing environment of multiple different computing devices disposed in different network domains defined over a computer communications network, each different network domain is at least separately administered or separately secured; and,
   an infrastructure validating module executing in memory of the at least one computer, the infrastructure validating module comprising program code that when executed by the at least one processor causes the at least one computer to:
   detect an anomaly in a computing environment of multiple different computing devices disposed in multiple different network domains, each different network domain being separately administered or separately secured; and,
   on condition that the anomaly is detected:
   (A) acquire administrative network privileges in order to access the multiple different network domains in the computing environment;
   (B) identify one or more existing resources in the computing environment;
   (C) load a signature file into memory and extract from the signature file one or more infrastructure requirements of the computing environment contained within the signature file, the requirements including resource requirements of the multiple different computing devices disposed in multiple different network domain;
   (D) compare one of the one or more existing resources to a corresponding infrastructure requirement contained within the signature file to determine whether or not a disparity exists between the one of the one or more existing resources and the corresponding infrastructure requirement; and,
   (E) on condition that the disparity is determined to exist between the one of the one or more existing resources and the corresponding infrastructure requirement, adjust a configuration of the computing environment by at least one of removing the disparity or changing a corresponding existing resource to conform with the corresponding infrastructure requirement.

7. The system of claim 6, wherein the program code of the infrastructure validating module that when executed by the at least one processor further causes the at least one computer to report the results of comparing the one of the one or more existing resources to the corresponding infrastructure requirement.

8. The system of claim 7, wherein the program code of the infrastructure validating module that when executed by the at least one processor causes the at least one computer to report the results of comparing the one of the one or more existing resources to the corresponding infrastructure requirement comprises program code that when executed by the at least one processor causes the at least one computer to report the results of comparing the one of the one or more existing resources to the corresponding infrastructure requirement to a user by displaying the results in a dialog box to the user.

9. The system of claim 7, wherein the program code of the infrastructure validating module that when executed by the at least one processor causes the at least one computer to report the results of comparing the one of the one or more existing resources to the corresponding infrastructure requirement comprises program code that when executed by the at least one processor causes the at least one computer to report the results of comparing the one of the one or more existing resources to the corresponding infrastructure requirement via a log.

10. The system of claim 6, wherein the program code of the infrastructure validating module is further enabled to:
(F) on condition that an error is generated upon comparing the one of the one or more existing resources to the corresponding infrastructure requirement denoted in the signature file, determine whether vendor-supplied documentation corresponding to the error exists; and,
(G) on condition that the vendor-supplied documentation corresponding to the error exists, display the error and also the vendor-supplied documentation in a dialog box to a user.

11. A computer program product for debugging an infrastructure of a computing environment of multiple different computing devices disposed in multiple different network domains, each different network domain being separately administered or separately secured, the computer program product comprising:
a non-transitory computer readable storage medium having computer readable program code embodied therewith that when executed by a processor of a computer causes the computer to:
detect an anomaly in a computing environment of multiple different computing devices disposed in multiple different network domains, each different network domain being separately administered or separately secured; and,
on condition that the anomaly is detected:
(A) acquire administrative network privileges in order to access the multiple different network domains in the computing environment;
(B) identify one or more existing resources in the computing environment;
(C) load a signature file into memory and extract from the signature file one or more infrastructure requirements of the computing environment contained within the signature file, the requirements including resource requirements of the multiple different computing devices disposed in multiple different network domain;
(D) compare one of the one or more existing resources to a corresponding infrastructure requirement contained within the signature file to determine whether or not a disparity exists between the one of the one or more existing resources and the corresponding infrastructure requirement; and,
(E) on condition that the disparity is determined to exist between the one of the one or more existing resources and the corresponding infrastructure requirement, adjust a configuration of the computing environment by at least one of removing the disparity or changing a corresponding existing resource to conform with the corresponding infrastructure requirement.

12. The computer program product of claim 11, wherein the computer readable program code embodied therewith that when executed by the processor of the computer further causes the computer to report the results of comparing the one of the one or more existing resources to the corresponding infrastructure requirement.

13. The computer program product of claim 12, wherein the computer readable program code embodied therewith that when executed by the processor of the computer causes the computer to report the results of comparing the one of the one or more existing resources to the corresponding infrastructure requirements comprises computer readable program code embodied therewith that when executed by the processor of the computer to report the results of comparing the one of the one or more existing resources to the corresponding infrastructure requirements via a log.

14. The computer program product of claim 11, wherein the computer readable program code embodied therewith that when executed by the processor of the computer further causes the computer to:
(F) on condition that an error is generated upon comparing the one of the one or more existing resources to the corresponding infrastructure requirements denoted in the signature file, determine whether vendor-supplied documentation corresponding to the error exists; and,
(G) on condition that the vendor-supplied corresponding to the error exists, display the error and also the vendor-supplied documentation in a dialog box to the user.

* * * * *